United States Patent
Uchimi et al.

(10) Patent No.: US 12,382,865 B2
(45) Date of Patent: Aug. 12, 2025

(54) WORK MACHINE WITH HOUSING AND CASE

(71) Applicant: HONDA MOTOR CO., LTD., Tokyo (JP)

(72) Inventors: Makoto Uchimi, Wako (JP); Masashi Takeichi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 863 days.

(21) Appl. No.: 17/631,030

(22) PCT Filed: Aug. 7, 2019

(86) PCT No.: PCT/JP2019/031059
§ 371 (c)(1),
(2) Date: Jan. 28, 2022

(87) PCT Pub. No.: WO2021/024399
PCT Pub. Date: Feb. 11, 2021

(65) Prior Publication Data
US 2022/0264794 A1 Aug. 25, 2022

(51) Int. Cl.
*A01D 34/81* (2006.01)
*A01D 34/78* (2006.01)
*A01D 101/00* (2006.01)

(52) U.S. Cl.
CPC ............ *A01D 34/81* (2013.01); *A01D 34/78* (2013.01); *A01D 2101/00* (2013.01)

(58) Field of Classification Search
CPC ..... A01D 34/81; A01D 34/78; A01D 2101/00
USPC ...................................... 50/320.1; 56/DIG. 9
See application file for complete search history.

(56) References Cited

U.S. PATENT DOCUMENTS

| | | | | |
|---|---|---|---|---|
| 5,606,851 | A * | 3/1997 | Bruener | A01D 34/6806 56/10.8 |
| 5,819,513 | A * | 10/1998 | Braun | A01D 34/828 56/11.9 |
| 8,910,459 | B2 * | 12/2014 | Abe | A01D 34/81 56/320.1 |
| 10,111,383 | B2 * | 10/2018 | Yamaoka | A01D 34/81 |

(Continued)

FOREIGN PATENT DOCUMENTS

| | | | | |
|---|---|---|---|---|
| DE | 196 04 648 A1 | | 9/1996 | |
| GB | 2167636 A | * | 6/1986 | ............ A01D 34/81 |
| JP | H1084739 A | * | 4/1998 | ............ A01D 34/81 |

(Continued)

OTHER PUBLICATIONS

International Preliminary Report on Patentability dated Feb. 17, 2022, 8 pages.

(Continued)

*Primary Examiner* — Joseph M Rocca
*Assistant Examiner* — Sunny D Webb
(74) *Attorney, Agent, or Firm* — Rankin, Hill & Clark LLP

(57) ABSTRACT

A work machine that can achieve size reduction and weight reduction of a housing. The work machine includes a housing, a motor fixed to an upper surface of the housing, a battery connected with the motor, and a blade driven by the motor. The motor is covered by a motor case fixed to the upper surface of the housing. The motor case is fixed to the upper surface of the housing in a different part from the motor.

5 Claims, 9 Drawing Sheets

(56) References Cited

U.S. PATENT DOCUMENTS 10,485,166 B2 * 11/2019 Wang ..................... A01D 34/81
2008/0086997 A1 4/2008 Lucas et al.

FOREIGN PATENT DOCUMENTS

JP  2014-147353  8/2014
JP  2018-102251  7/2018

OTHER PUBLICATIONS

International Search Report, Date of mailing: Oct. 21, 2019, 2 pages.
Written Opinion of the International Searching Authority dated Oct. 21, 2019, 4 pages.
German Office Action dated Apr. 18, 2024 issued in corresponding German application No. 11 2019 007 604.3; English translation included (8 pages).

* cited by examiner

WORK MACHINE WITH HOUSING AND CASE

TECHNICAL FIELD

The present invention relates to a work machine.

BACKGROUND ART

In related art, a work machine has been known which includes a housing as a working machine main body, a working unit performing predetermined work, a motor as a motive power source of the working unit, and a battery supplying electric power to the motor. Among such work machines, a work machine has been known in which an electric motor and a battery are attached to a housing via a shared attachment member (for example, see Patent Literature 1).

CITATION LIST

Patent Literature

[Patent Literature 1]
Japanese Patent Laid-Open No. 2018-102251

SUMMARY OF INVENTION

Technical Problem

However, in a configuration in related art, because loads of an electric motor and a battery are concentrated in a predetermined attachment part, strength and rigidity of the housing have to be enhanced, and this may lead to a size increase and a weight increase of the housing.

An object of one aspect of the present invention is to provide a work machine that can achieve size reduction and weight reduction of a housing.

Solution to Problem

One aspect of the present invention provides a work machine including: a housing; a motor fixed to an upper surface of the housing; a battery connected with the motor; and a working unit to be driven by the motor, in which the motor is covered by a case fixed to the upper surface of the housing, the battery is fixed to an upper surface of the case covering the motor, and the case is fixed to the upper surface of the housing in a different part from the motor.

In one aspect of the present invention, in the work machine, the case is fixed to a first fixing portion provided to the housing, and the first fixing portion is formed in a wider range than an external shape of the battery.

In one aspect of the present invention, in the work machine, the motor and the battery are arranged side-by-side on the upper surface of the housing, and the first fixing portion is formed in a wider range than a periphery of an external shape of the motor and the external shape of the battery.

In one aspect of the present invention, in the work machine, the housing is provided with a second fixing portion within a range surrounded by the first fixing portion.

In one aspect of the present invention, in the work machine, the case is fastened to the first fixing portion by a fastening member, fitted to the second fixing portion, and thereby fixed to the housing.

In one aspect of the present invention, in the work machine, the case is provided with a cover covering the battery in an openable and closable manner.

In one aspect of the present invention, in the work machine, the battery is provided in front of the motor.

In one aspect of the present invention, in the work machine, the working unit is a blade that mows lawn grass below the housing.

Advantageous Effects of Invention

In one aspect of the present invention, size reduction and weight reduction of a housing can be achieved.

DESCRIPTION OF EMBODIMENT

Figure 1:
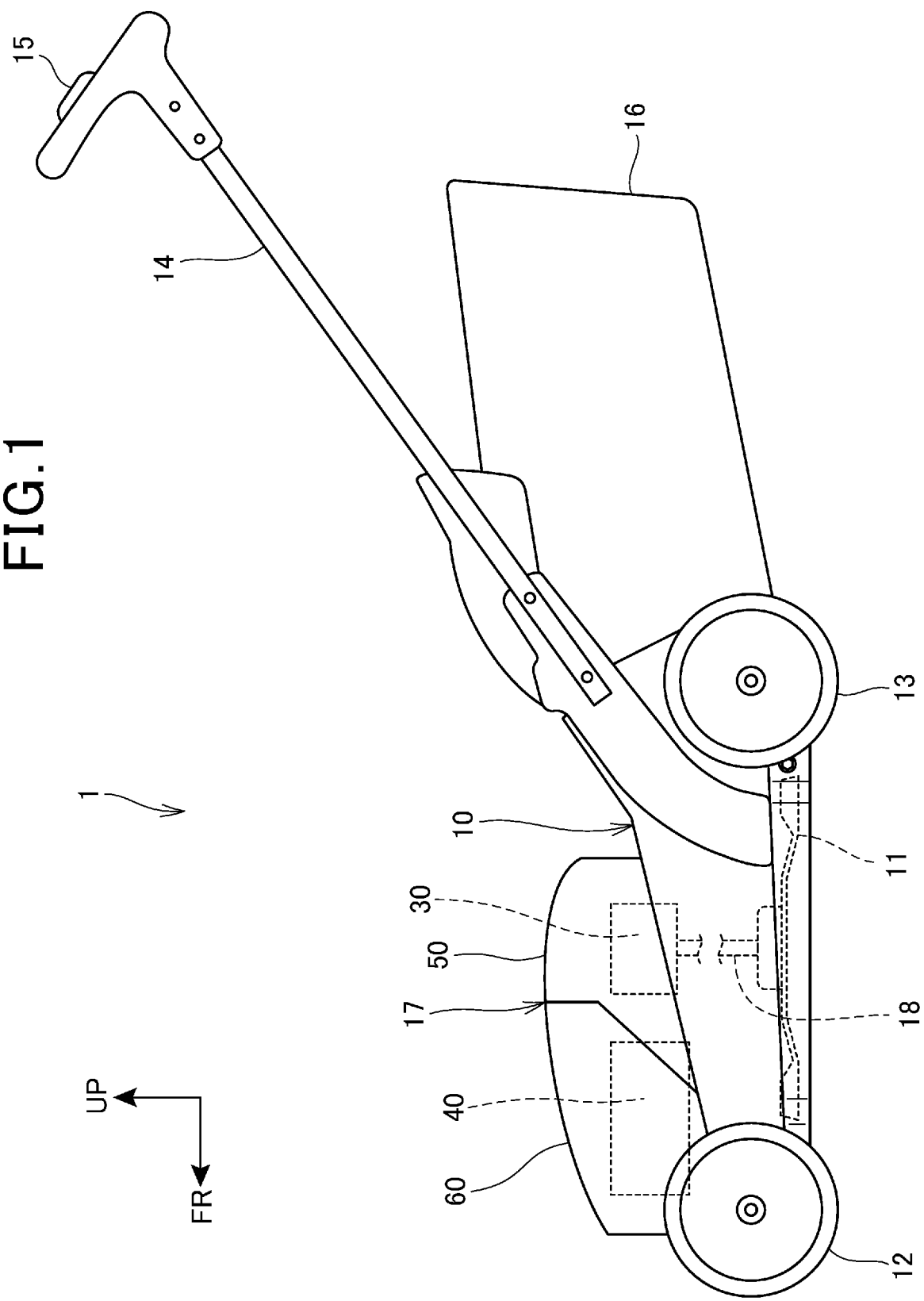
FIG. 1 is a side view that illustrates an outline configuration of a work machine according to an embodiment of the present invention.

An embodiment of the present invention will hereinafter be described with reference to drawings. In this embodiment, a lawn mower will be described as an example of a work machine.

Note that in the description, as for descriptions of front, rear, left, right, up, and down, the forward travel direction of the work machine is defined as the front of a vehicle unless otherwise mentioned. A reference character FR indicated in each of drawings denotes the front of the vehicle, a reference character UP denotes the upper side of the vehicle, and a reference character LH denotes the left of the vehicle.

FIG. 1 is a side view that illustrates an outline configuration of a work machine 1 according to the embodiment of the present invention.

The work machine 1 of this embodiment is a walking lawn mower that moves by being pushed by a worker performing lawn mowing work.

The work machine 1 includes a housing 10 as a main body. The housing 10 is a member that houses a blade 11 as a working unit of the work machine 1 on an inside, and in the housing 10, a lower surface facing a lawn ground is open.

A pair of left and right front wheels 12 are provided in a front portion of the housing 10, and a pair of left and right rear wheels 13 are provided in a rear portion of the housing 10. An operation handle 14 extending rear-upward is provided in a rear portion of the housing 10. An operation unit 15 by which the worker operates rotation, stop, the number of rotations, and so forth of the blade 11 is provided in an upper end portion of the operation handle 14.

Figure 2:
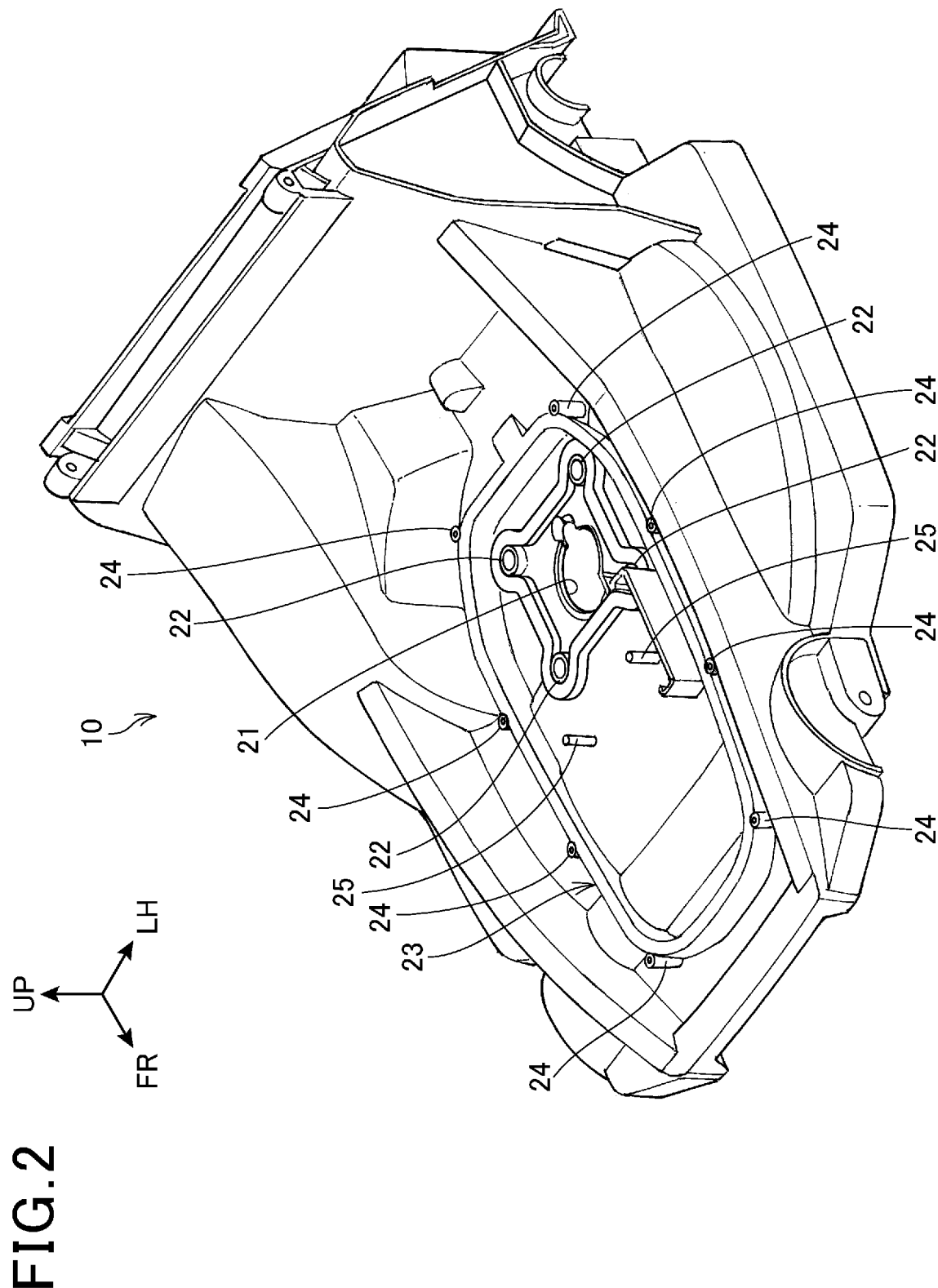
FIG. 2 is a perspective view of a housing.

FIG. 2 is a perspective view of the housing 10.

As illustrated in FIG. 2, an insert-through hole 21 for causing an upper surface to communicate with the lower surface is provided at a center of the housing 10, and plural motor fixing portions 22 formed to protrude upward from the upper surface of the housing 10 are provided around the insert-through hole 21.

A first case fixing portion 23 is provided on the upper surface of the housing 10. The first case fixing portion 23 is formed to protrude upward from the upper surface of the housing 10 to a predetermined height, and the first case fixing portion 23 is formed in an annular shape that surrounds the insert-through hole 21 and each of the motor fixing portions 22 on the upper surface of the housing 10. That is, a front end side of the first case fixing portion 23 in the front-rear direction of the housing 10 is arranged between the pair of front wheels 12, and a rear end side is arranged in the rear of each of the motor fixing portions 22.

In the first case fixing portion 23, case fastening portions 24 into which screw members 94 can be threaded are provided at predetermined intervals in the circumferential direction of the first case fixing portion 23.

On the upper surface of the housing 10, a pair of second case fixing portions 25 are provided to protrude in a range surrounded by the first case fixing portion 23 and in parts positioned on a front side of the motor fixing portions 22.

Figure 3:
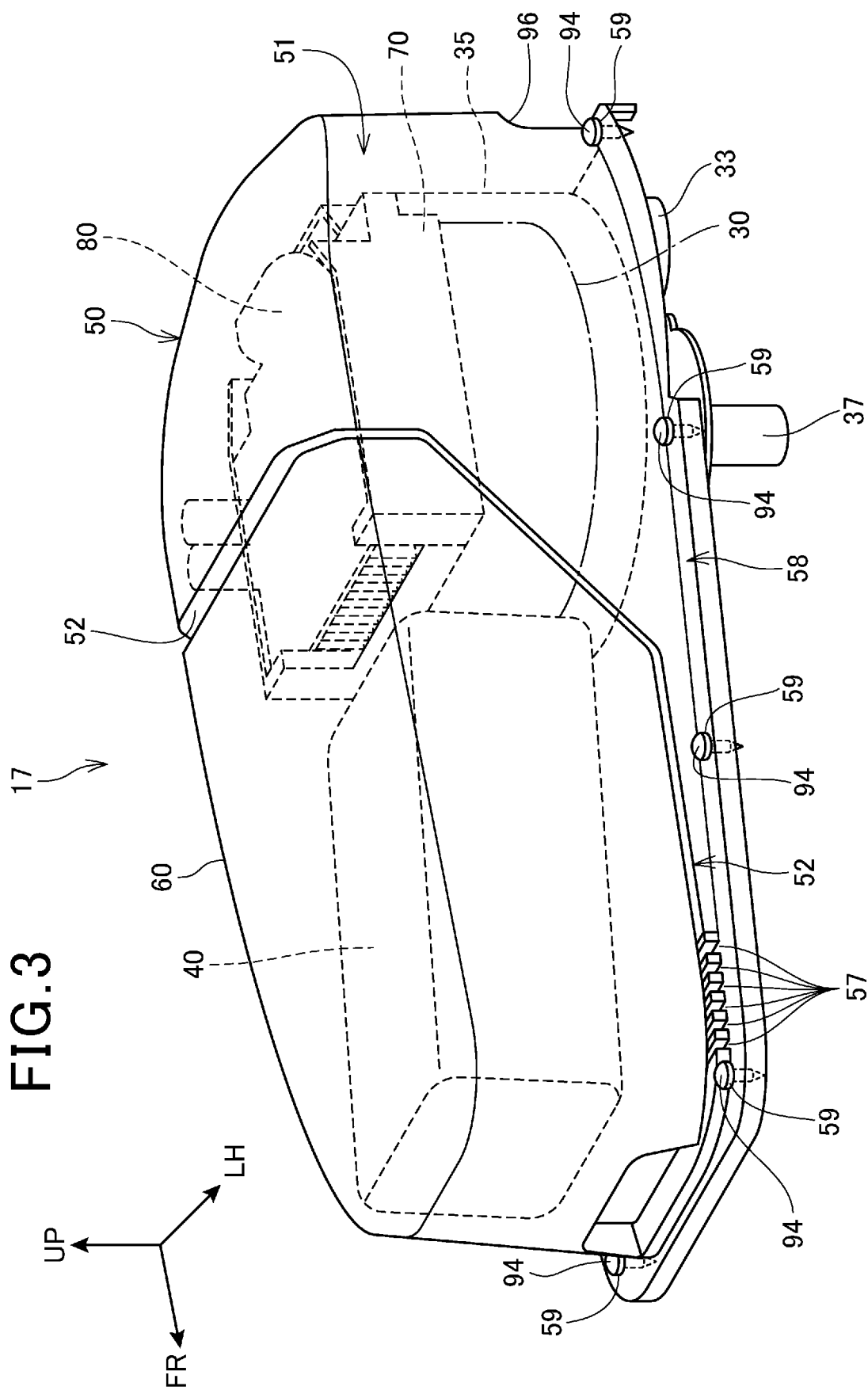
FIG. 3 is a perspective view of a power unit as seen from a lateral side.
Figure 4:
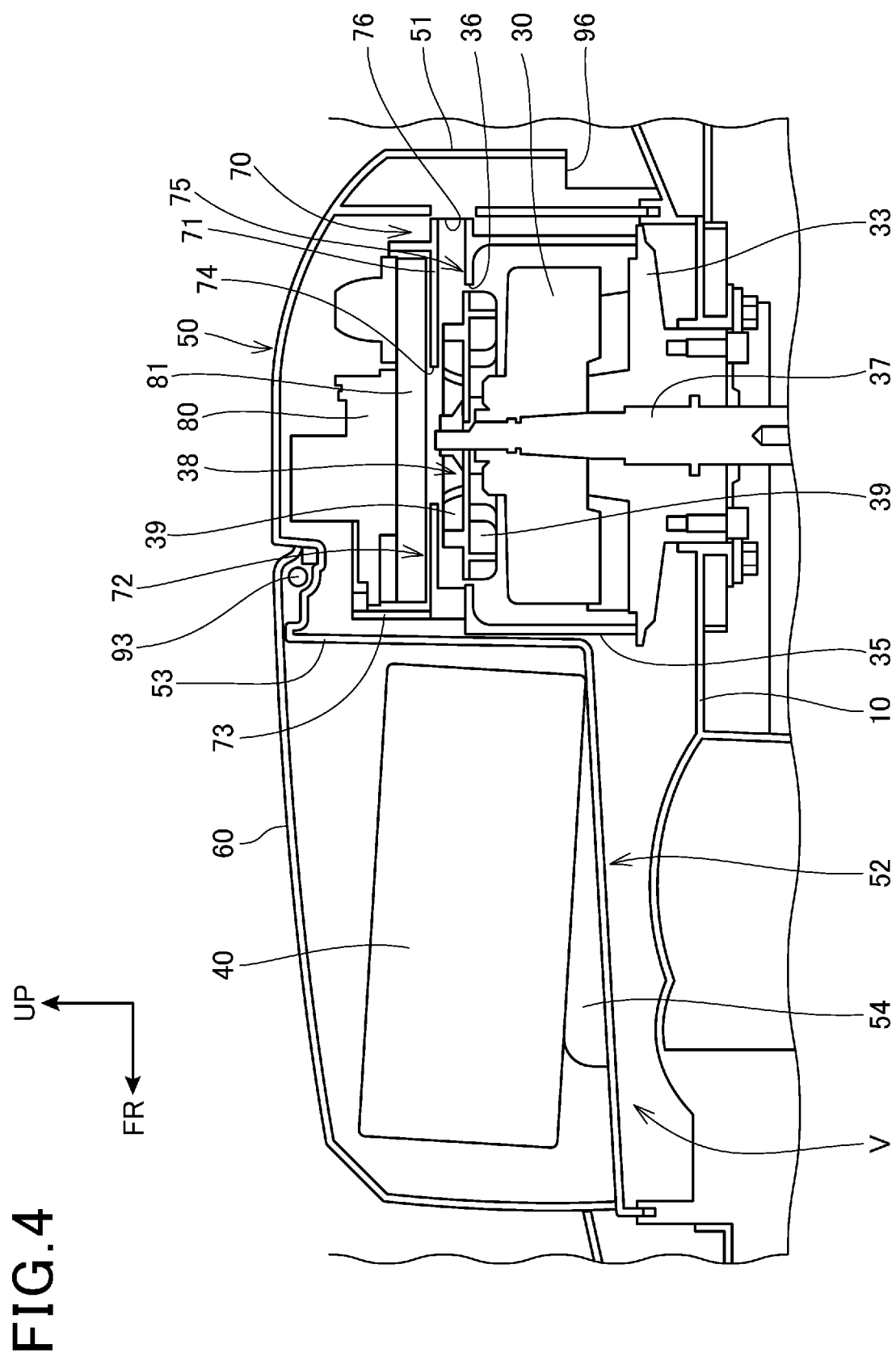
FIG. 4 is a vertical cross-sectional view in a longitudinal direction, which illustrates an outline configuration of an inside of the power unit.
Figure 5:
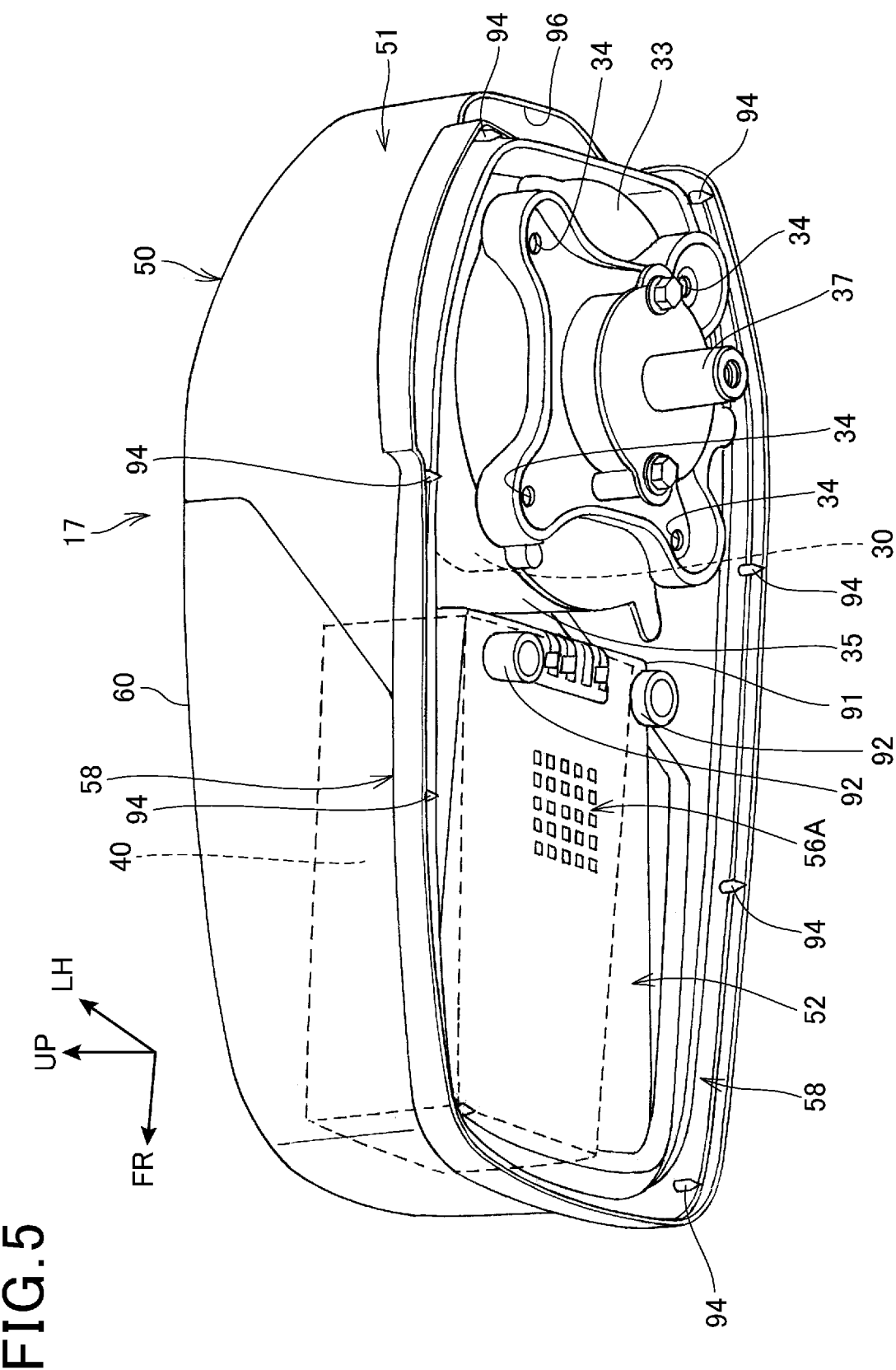
FIG. 5 is a perspective view of the power unit as seen from below.

FIG. 3 is a perspective view of a power unit 17, and FIG. 4 is a vertical cross-sectional view in the longitudinal direction, which illustrates an outline configuration of an inside of the power unit 17. FIG. 5 is a perspective view of the power unit 17 as seen from below.

The power unit 17 is arranged on the upper surface of the housing 10. As illustrated in FIG. 3 and FIG. 4, the power unit 17 is a unit that houses a motor 30 and a battery 40.

The motor 30 of this embodiment is a drive source for rotating the blade 11, and the motor 30 is driven by electric power supplied from the battery 40.

As illustrated in FIG. 5, the motor 30 is fixed to an upper surface of a motor retainment member 33. The motor retainment member 33 includes plural retainment holes 34, each of which passes through from the upper surface to a lower surface. The retainment holes 34 and the respective motor fixing portions 22 are fastened together by fastening members such as bolts in a state where the retainment holes 34 are arranged in the positions corresponding to the respective motor fixing portions 22, and the motor 30 and the motor retainment member 33 are thereby fixed to the housing 10.

A motor cover 35 that covers the motor 30 is provided in an outer periphery on the upper surface of the motor retainment member 33. As illustrated in FIG. 4, an opening 36 is provided in an upper surface of the motor cover 35.

Both ends of a driving shaft 37 of the motor 30 respectively protrude from an upper surface and a lower surface of the motor 30. A lower end side of the driving shaft 37 is inserted through the insert-through hole 21, and the blade 11 arranged on the lower surface of the housing 10 is attached to a lower end of the driving shaft 37. The rotation center of the blade 11 is the driving shaft 37. That is, the driving shaft 37 rotates by driving of the motor 30, and the blade 11 is thereby rotated and driven.

A cooling fan 38 is provided at an upper end of the driving shaft 37. The cooling fan 38 is formed into a disk shape and closes the opening 36 of the motor cover 35.

Note that if the cooling fan 38 demarcates the motor 30 from a space above the motor 30, the cooling fan 38 may be provided with a predetermined gap from the opening 36.

Plural vanes 39 are provided on upper and lower surfaces of the cooling fan 38. The cooling fan 38 rotates in response to rotation and driving of the motor 30, the vanes 39 provided on a lower surface side of the cooling fan 38 stir air on an inside of the motor cover 35, causes thermal diffusion, and thereby cools the motor 30.

The motor 30, the motor cover 35, and the cooling fan 38 are covered by a motor case 50. The motor case 50 of this embodiment is formed of a resin, and the motor case 50 includes an accommodation portion 51 that covers the motor 30 and a flat plate portion 52 on which the battery 40 is arranged.

A lower surface of the accommodation portion 51 is open, and the accommodation portion 51 covers the motor 30 placed on the upper surface of the housing 10, a control device 80, and an air introduction member 70. In a part positioned on a rear side of the accommodation portion 51 in the front-rear direction of the work machine 1, a discharge port 96 which opens downward is provided.

Figure 6:
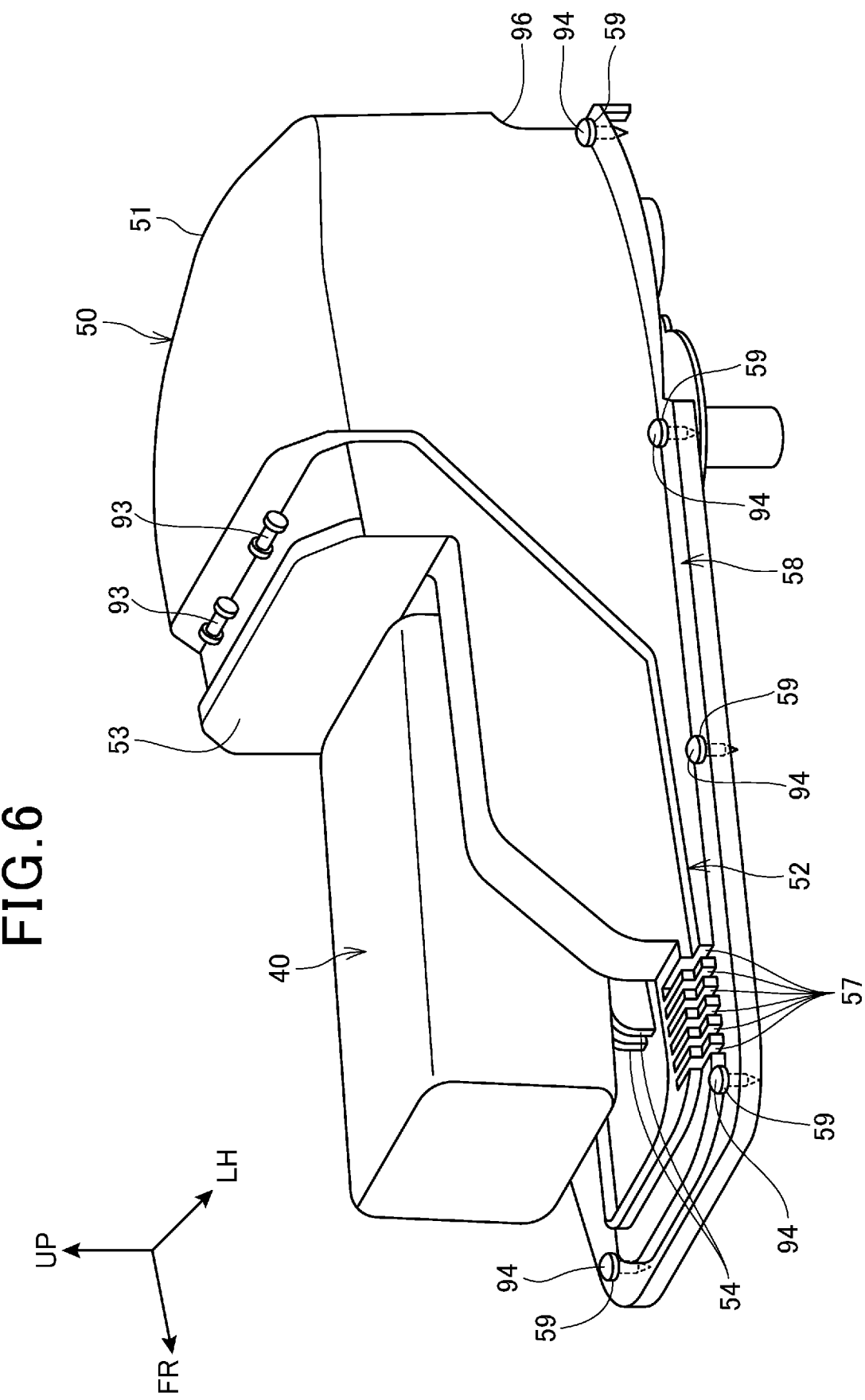
FIG. 6 is a perspective view that illustrates the power unit with a battery cover detached.
Figure 7:
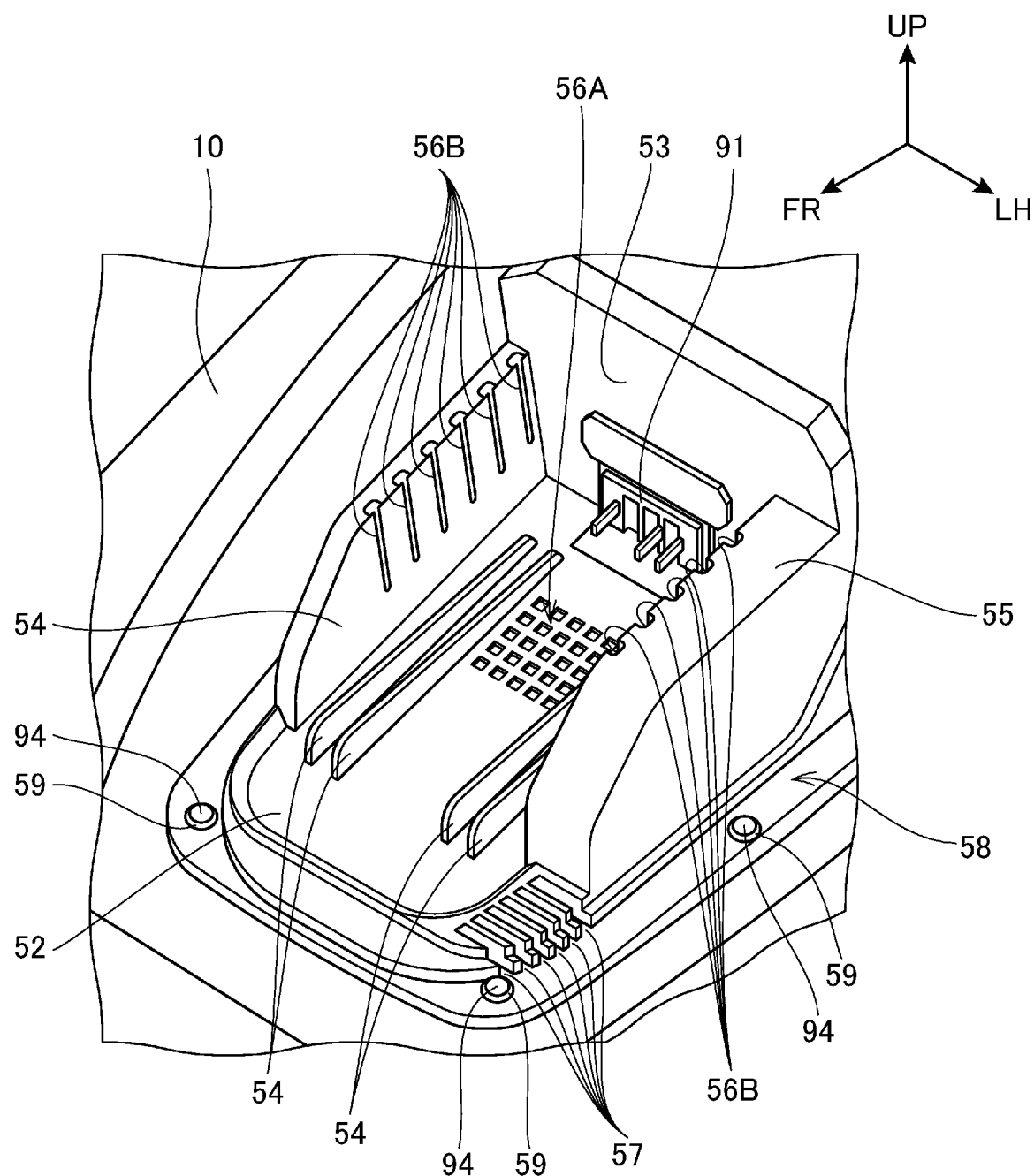
FIG. 7 is a perspective view of a flat plate portion.

FIG. 6 is a perspective view that illustrates the power unit 17 with a battery cover 60 detached, and FIG. 7 is a perspective view of the flat plate portion 52.

As illustrated in FIG. 6 and FIG. 7, the flat plate portion 52 is arranged on a front side of the accommodation portion 51 in the front-rear direction of the work machine 1. A partition wall 53 is provided on a front side in a side surface of the accommodation portion 51, and the flat plate portion 52 is provided at a lower end of the partition wall 53. The flat plate portion 52 is formed such that an upper surface is inclined downward from the accommodation portion 51 side toward the front side of the work machine 1.

Plural ribs 54 extending along the front-rear direction of the work machine 1 are formed to protrude on the upper surface of the flat plate portion 52. Each of upper sides of the ribs 54 is formed to be generally horizontal. Thus, each of the ribs 54 protrudes higher from the upper surface of the flat plate portion 52 toward the front side of the work machine 1. A bottom surface of the battery 40 arranged on the flat plate portion 52 is supported by the upper sides of the ribs 54.

A terminal block 91 with which terminals of the battery 40 are electrically connected is provided at a center of the lower end of the partition wall 53, and the battery 40 and the motor 30 are electrically connected together by the terminal block 91.

A pair of side walls 55 are provided on the upper surface of the flat plate portion 52. The pair of side walls 55 respectively cover portions of both side surface of the placed battery 40, the side surfaces positioned in the width direction of the battery 40.

The flat plate portion 52 is provided with plural bottom surface ventilation ports 56A for causing the upper surface to communicate with a lower surface of the flat plate portion 52, that is, an outer side to communicate with an inner side of the motor case 50. Each of the bottom surface ventilation ports 56A is provided in a part of the flat plate portion 52 which is adjacent to the partition wall 53 side.

Similarly, each of the side walls 55 is provided with plural side surface ventilation ports 56B for causing the outer side to communicate with the inner side of the motor case 50. Each of the side surface ventilation ports 56B is formed into a slit shape extending in the up-down direction and is continuous with a portion below the flat plate portion 52 via a communication pipe provided on an inside of the side wall 55.

Plural groove portions 57 formed by being notched downward are provided in predetermined parts on a front side in a periphery of the flat plate portion 52. Each of the groove portion 57 is formed to extend from an outer periphery of the flat plate portion 52 toward an inner side of the flat plate portion 52.

On a lower surface side of the flat plate portion 52, a pair of insertion portions 92 in which the second case fixing portions 25 are inserted are provided to protrude downward. The pair of insertion portions 92 are arranged in positions between which the terminal block 91 is interposed along the width direction of the work machine 1, and each of the pair of insertion portions 92 has a recessed shape recessed downward.

A case outer peripheral portion 58 extending outward with a predetermined width throughout a whole circumference is provided at a lower end of the motor case 50.

The case outer peripheral portion 58 and the first case fixing portion 23 of the housing 10 are formed into generally the same shape in a planar view. A screw hole 59 is provided in each part of the case outer peripheral portion 58 which corresponds to the case fastening portion 24 of the first case fixing portion 23.

The case outer peripheral portion 58 of the motor case 50 is placed on an upper end of the first case fixing portion 23. The screw member 94 is inserted through and fastened to each of the screw holes 59 and each of the case fastening portions 24 in a state where the pair of insertion portions 92 are respectively inserted in the second case fixing portions 25, and the motor case 50 is thereby fixed to the housing 10.

In the motor case 50 fixed in such a manner, as illustrated in FIG. 4, a space V is provided between the flat plate portion 52 and the upper surface of the housing 10.

The battery 40 of this embodiment has a rectangular parallelepiped shape and is housed in the flat plate portion 52 such that the longitudinal direction goes along the front-rear direction of the work machine 1.

The battery 40 and the flat plate portion 52 are covered with the battery cover 60 formed of a resin.

In a closed state, the battery cover 60 covers a portion from an upper end of the partition wall 53 to a front end of a peripheral portion of the flat plate portion 52 in the front-rear direction of the work machine 1 and covers the pair of side walls 55 in the width direction of the work machine 1. A periphery of the battery cover 60 contacts with the periphery of the flat plate portion 52 and a whole periphery of a front surface of the accommodation portion 51. A sealing material is provided to the periphery of the battery cover 60 so as to tightly contact with the periphery of the flat plate portion 52 and a periphery of the partition wall 53 when the battery cover 60 is in the closed state. Accordingly, the battery 40 and the flat plate portion 52 are shielded from trash, dust, and so forth on the outside.

The battery cover 60 is attached to the motor case 50 by hinges 93 provided around the upper end of the partition wall 53 on the upper surface of the accommodation portion 51, and the battery cover 60 is provided to be openable and closable about the hinges 93 as pivots.

The worker exposes the battery 40 by opening the battery cover 60 and replaces the battery 40. As described above, the battery 40 is partitioned from the motor 30 and the control device 80 by the motor case 50. Thus, even in a case where the battery cover 60 is opened, the motor 30 and the control device 80 are not exposed to the outside, and entry of trash and dust from the outside is inhibited.

The plural groove portions 57 are provided in predetermined parts in the periphery of the flat plate portion 52. Thus, an inside of the battery cover 60 may communicate with an outside even if the battery cover 60 is in the closed state.

Figure 8:
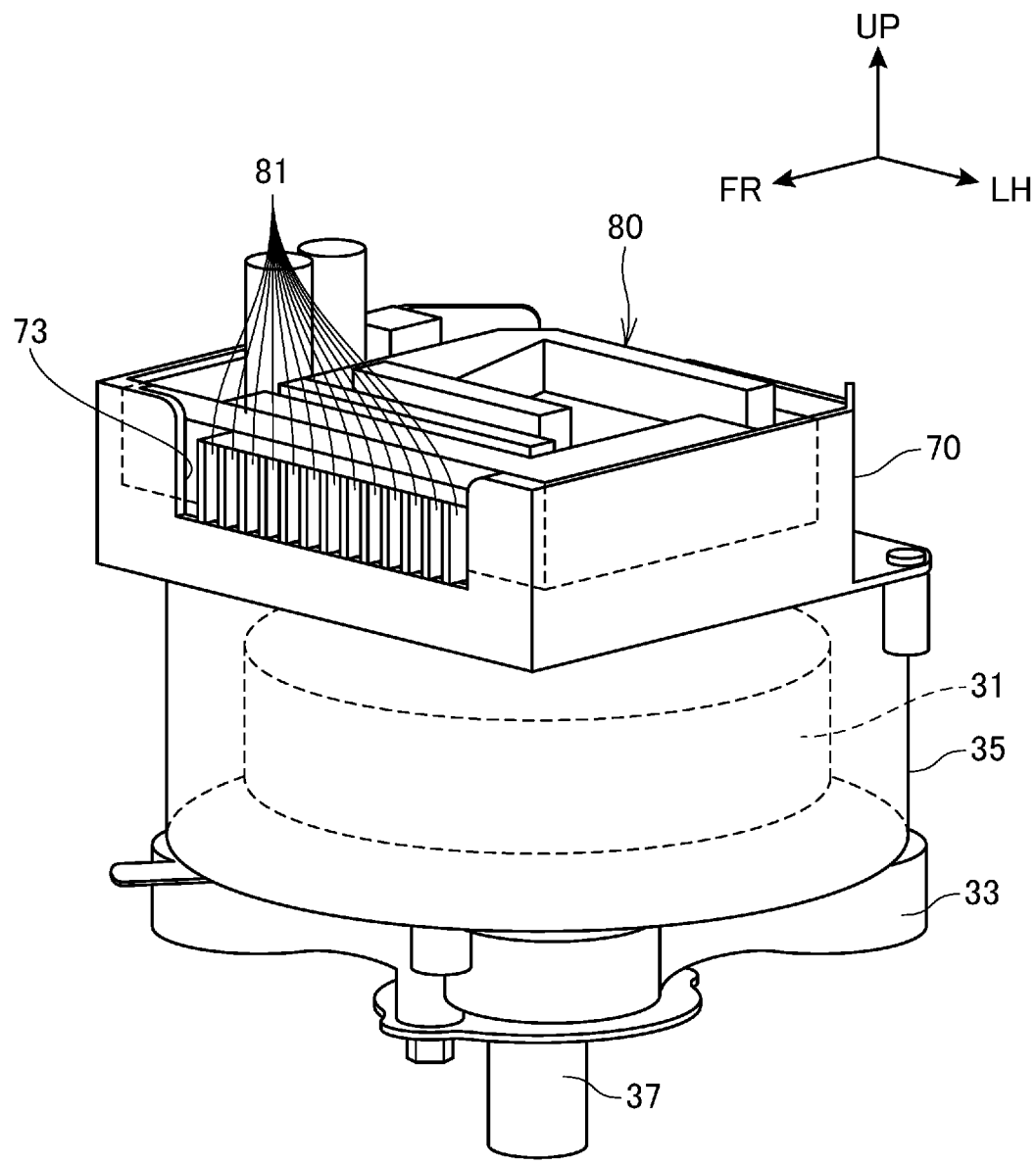
FIG. 8 is a perspective view that illustrates a motor, an air introduction member, and a control device.
Figure 9:
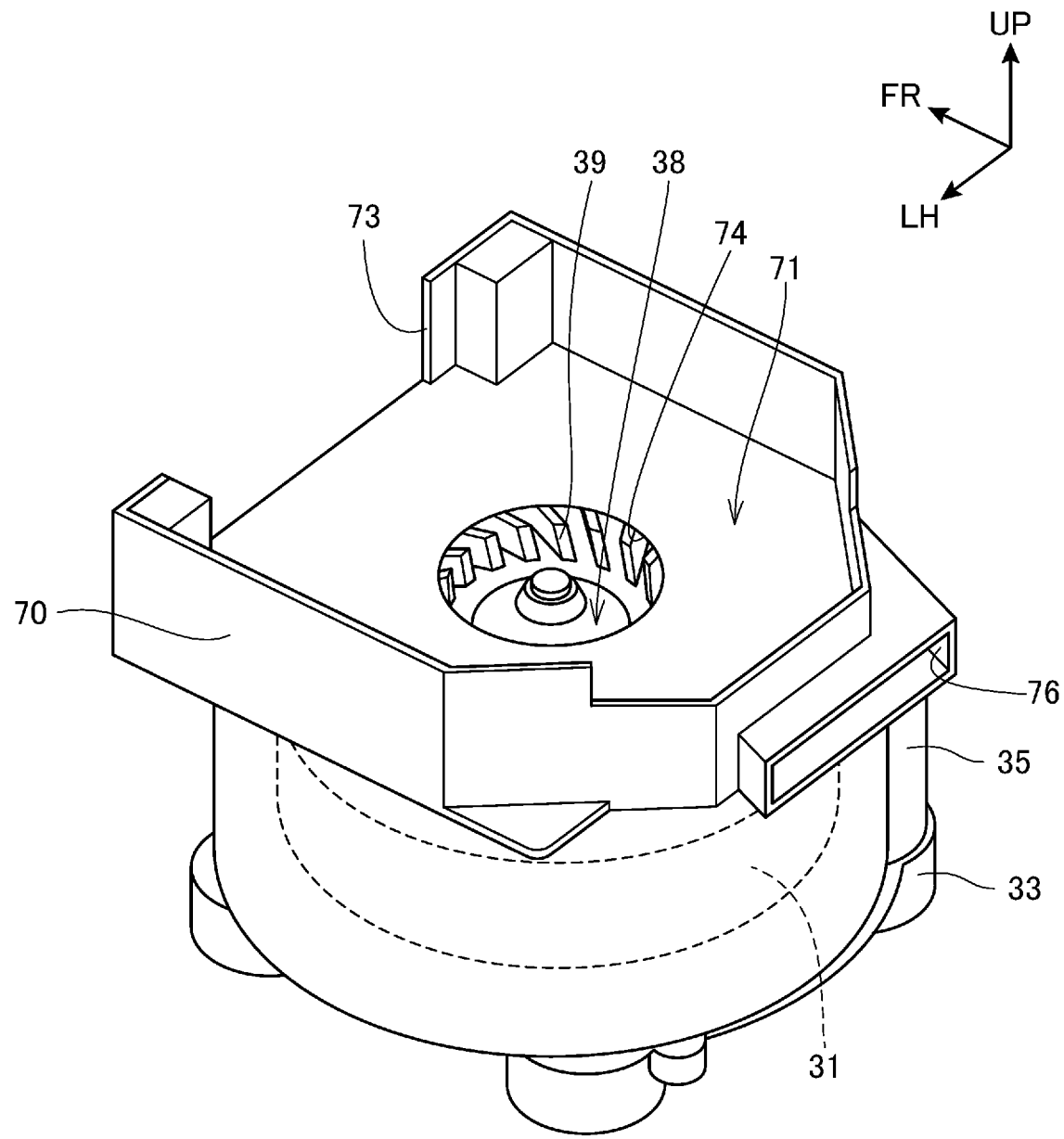
FIG. 9 is a perspective view of the air introduction member as seen from the rear, which is placed on the motor.

FIG. 8 is a perspective view that illustrates the motor 30, the air introduction member 70, and the control device 80, and FIG. 9 is a perspective view of the air introduction member 70 as seen from the rear, which is placed on the motor 30. Note that in FIG. 9, the control device 80 is omitted.

Next, an inside of the accommodation portion 51 will be described in detail.

As illustrated in FIG. 8 and FIG. 9, on the inside of the accommodation portion 51, the air introduction member 70 having a pentagonal frame shape in a top view is placed above the motor 30. A partition plate 71 is provided in an intermediate area of the air introduction member 70 in the up-down direction.

A communication hole 74 is provided at a center of the partition plate 71. The communication hole 74 is provided in a part positioned above the vanes 39 on an upper surface side of the cooling fan 38 and causes a space on an upper side to communicate with a space on a lower side of the partition plate 71 provided to the air introduction member 70. The space on the lower side of the partition plate 71 covers the vanes 39 on the upper surface side of the cooling fan 38.

On the upper side of the partition plate 71 of the air introduction member 70, a surface positioned on a front side in the front-rear direction of the work machine 1 is notched with a predetermined width, and the suction port 73 is thereby formed.

On the lower side of the partition plate 71 of the air introduction member 70, in a surface positioned on a rear side in the front-rear direction of the work machine 1, an exhaust port 76 opening rearward is provided.

In such a manner, the air introduction member 70 is provided with an air path through which air flows from the suction port 73 to the exhaust port 76 by rotation of the cooling fan 38. The upper side of the partition plate 71 forms an upper stage air path 72 of the air introduction member 70, and the lower side forms a lower stage air path 75 of the air introduction member 70.

The control device 80 is arranged on an upper surface of the partition plate 71 of the air introduction member 70. The control device 80 is a member that includes an electric circuit which controls electric power supply performed from the battery 40 to the motor 30. The control device 80 turns on or off the power supply to the motor 30 in accordance with the operation of the operation unit 15 provided to the operation handle 14 and thereby rotates or stops the motor 30. The control device 80 changes the number of rotations of the motor 30 in accordance with the operation of the operation unit 15 by the worker.

On a lower surface of the control device 80, plural heat dissipation fins 81 protruding downward are aligned so as to extend in the front-rear direction of the work machine 1. The heat dissipation fins 81 are placed on the upper surface of the partition plate 71, and the control device 80 is thereby housed in the air introduction member 70. One end portion of each of the heat dissipation fins 81 is exposed from the suction port 73 of the air introduction member 70.

In such a manner, the partition plate 71 is provided to the air introduction member 70, the control device 80 and the motor 30 may thereby be arranged at a predetermined interval, and heat transmission from the motor 30 to the control device 80 may be inhibited.

When the cooling fan 38 is rotated and driven, the air taken from the outside of the work machine 1 into the inside of the battery cover 60 is taken into an inside of the motor case 50 through the bottom surface ventilation ports 56A and the side surface ventilation ports 56B. The bottom surface ventilation ports 56A and the side surface ventilation ports 56B are positioned below the suction port 73 of the air introduction member 70, and the air taken in moves upward.

The air taken into the inside of the motor case 50 flows into the air introduction member 70, and the control device 80 is thereby cooled. This air is exhausted from the air introduction member 70 and thereafter released from the motor case 50.

A bag-shaped mown lawn grass storage body 16 which stores lawn grass mown by the blade 11 is provided in a rear portion of the housing 10. The lawn grass mown by the blade 11 is stored in the mown lawn grass storage body 16 while passing through a predetermined path in the housing 10. Note that the mown lawn grass storage body 16 of this embodiment is detachably provided, and the work machine 1 may be used without the mown lawn grass storage body 16 mounted.

Next, an action of this embodiment will be described.

The worker walks while gripping the operation handle 14 and pushing the work machine 1 forward, the blade 11 driven by the motor 30 rotates, and the work machine 1 thereby mows lawn grass on a lawn ground.

In the work machine 1 of this embodiment, the motor 30 and the battery 40 are arranged side-by-side on the upper surface of the housing 10. The battery 40 is arranged in front of the motor 30 and extends to a position adjacent to a front end of the housing 10.

Accordingly, the center of gravity of the work machine 1 can be positioned low, and a work load in a case where the worker performs work by using the work machine 1 can be reduced.

Furthermore, in the upper surface of the housing 10, a front portion of the housing 10 can effectively be used as a placement portion of the battery 40. Thus, the load applied to the housing 10 can further be dispersed, and requested strength for the housing 10 can be decreased. Further, the weight of the housing 10 can be decreased, weight reduction can be achieved, and the work load in a case where the worker performs work by using the work machine 1 can be reduced.

In addition, because the battery 40 can be placed in the vicinity of the front end of the housing 10 as described above, the battery 40 can have a large capacity.

Mown lawn grass is accommodated in the mown lawn grass storage body 16 as described above. That is, the weight of the mown lawn grass storage body 16 changes in accordance with progress of work. Even in such a case, because the battery 40 is arranged in a front portion of the housing 10 to the extent that the other end portion of the battery 40 in the longitudinal direction is arranged between the pair of front wheels 12, balance of the work machine 1 is easily maintained. The mown lawn grass storage body 16 can have a large capacity.

As described above, the motor 30 is attached to the housing 10 via the motor retainment member 33, and the battery 40 is placed on the flat plate portion 52 of the motor case 50 covering the motor 30. That is, the motor 30 and the battery 40 are arranged in different positions of the upper surface of the housing 10 and are attached to the upper surface of the housing 10 via different members. Accordingly, parts in which the housing 10 retains the battery 40 and the motor 30 can be dispersed. Thus, the requested strength for the housing 10 can be decreased, the weight of the housing 10 can be decreased, and size reduction and weight reduction can be achieved.

The motor case 50 on which the battery 40 is placed is placed on the first case fixing portion 23. This first case fixing portion 23 is formed around the battery 40 and the motor 30 in the upper surface of the housing 10. That is, the first case fixing portion 23 is formed in a wider range than a periphery of an external shape of the battery 40 and an external shape of the motor 30. Accordingly, the load of the battery 40 can be dispersed in the upper surface of the housing 10. Thus, the requested strength for the housing 10 can be decreased, the weight of the housing 10 can be decreased, and size reduction and weight reduction can be achieved.

Further, the motor case 50 is supported by and fixed to the housing 10 by fitting between the pair of insertion portions 92 and the respective second case fixing portions 25. Accordingly, in a generally central portion of the motor case 50, the motor case 50 can be fixed to the housing 10 without using the screw members 94. Furthermore, the motor case 50 is supported by each of the second case fixing portions 25 in addition to the first case fixing portion 23, and the load of the battery 40 can thereby be dispersed in the upper surface of the housing 10.

The above-described embodiment provides the following effects.

The work machine 1 of this embodiment includes the housing 10, the motor 30 fixed to the upper surface of the housing 10, the battery 40 connected with the motor 30, and the working unit driven by the motor 30. The motor 30 is covered by the motor case 50 fixed to the upper surface of the housing 10, and the battery 40 is fixed to an upper surface of the motor case 50 covering the motor 30. Further, the motor case 50 is configured to be fixed to the upper surface of the housing 10 in a different part from the motor 30.

Accordingly, the parts in which the housing 10 retains the battery 40 and the motor 30 can be dispersed. Thus, the requested strength for the housing 10 can be decreased, the weight of the housing 10 can be decreased, and size reduction and weight reduction can be achieved.

Further, in this embodiment, the motor 30 and the battery 40 are arranged side-by-side on the upper surface of the housing 10, and the motor case 50 is fixed to the housing 10 by the first case fixing portion 23 provided to the housing 10. Further, the first case fixing portion 23 is configured to be formed in a wider range than the external shapes of the battery 40 and the motor 30. Accordingly, the load of the battery 40 can be dispersed in the upper surface of the housing 10.

Further, in this embodiment, a configuration is made in which the housing 10 is provided with the second case fixing portions 25 within the range surrounded by the first case fixing portion 23. Accordingly, in a generally central portion of the motor case 50, the motor case 50 can be fixed to the housing 10 without using the screw members 94.

Further, in this embodiment, the motor case 50 is configured to be fastened to the first case fixing portion 23 by the screw members 94, fitted to the second case fixing portions 25, and thereby fixed to the housing 10. Accordingly, the motor case 50 is supported by each of the second case fixing portions 25 in addition to the first case fixing portion 23, and the load of the battery 40 can thereby be dispersed in the upper surface of the housing 10. Further, in a generally central portion of the motor case 50, the motor case 50 can be fixed to the housing 10 without using the screw members 94.

Further, in this embodiment, a configuration is made in which the motor case 50 is provided with the battery cover 60 covering the battery 40 in an openable and closable manner. Accordingly, the battery 40 and the flat plate portion 52 are shielded from trash, dust, and so forth on the outside. Further, because the battery 40 is partitioned from the motor 30 and the control device 80 by the motor case 50, even in a case where the battery cover 60 is opened, trash and dust on the outside are inhibited from entering the motor 30 and the control device 80.

Further, in this embodiment, a configuration is made in which the battery 40 is provided in front of the motor 30. Accordingly, the center of gravity of the work machine 1 can be positioned low, the load applied to the housing 10 can further be dispersed, and weight reduction of the work machine 1 can be achieved.

The above-described embodiment represents one aspect of the present invention as an example, and any modification and application are possible without departing from the scope of the gist of the present invention.

For example, in the above-described embodiment, the first case fixing portion 23 is formed around the battery 40 and the motor 30. However, the first case fixing portion 23 is not limited to this but may be provided in a narrower range than the periphery of the external shape of the battery 40 and the external shape of the motor 30 as long as the first case fixing portion 23 is provided in a wider range than the external shape of the battery 40.

Further, for example, in the above-described embodiment, the motor 30 and the battery 40 are arranged side-by-side on the upper surface of the housing 10. However, arrangement is not limited to this, but such as a case where at least one end portion of the battery 40 is arranged above the motor 30, a portion of the battery 40 may be arranged to overlap with the motor 30 in a top view of the housing 10.

Further, for example, in the above-described embodiment, the flat plate portion 52 is provided on the front side of the accommodation portion 51 in the front-rear direction of the work machine 1, and the battery 40 is arranged on the flat plate portion 52. However, arrangement is not limited to this, but if the housing 10 has a sufficient space, the flat plate portion 52 and the battery 40 may be arranged in the rear of or on a lateral side of the accommodation portion 51.

Further, for example, the work machine 1 may be a walking autonomous traveling work machine that includes the motor 30 as a motive power source for travel for driving the pair of front wheels 12 or the pair of rear wheels 13, the walking autonomous traveling work machine with which the worker walks while driving the work machine 1 autonomously traveling by the motor 30.

Further, for example, the work machine 1 may be an autonomous traveling work machine that mows lawn grass while performing unmanned autonomous travel.

Further, for example, the work machine 1 may include a so-called hybrid system that is equipped with an engine (internal combustion engine), charges the battery 40 by driving the engine, and drives the motor 30 by charged electric power.

The invention claimed is:

1. A work machine comprising:
a housing; a motor fixed to an upper surface of the housing; a battery connected with the motor; and a working unit to be driven by the motor, wherein
the motor is covered by a case fixed to the upper surface of the housing,
the battery is fixed to an upper surface of the case covering the motor,
the case is fixed to the upper surface of the housing in a different part from the motor,
the case is fixed to a first fixing portion provided by the housing,
the motor and the battery are arranged side-by-side in a predetermined direction on the upper surface of the housing,
the first fixing portion is formed in a wider range than a periphery of an external shape of the motor and the external shape of the battery,
a case outer peripheral portion extending outward with a predetermined width throughout a whole circumference is provided at a lower end of the case,
the case outer peripheral portion and the first fixing portion are formed into a same shape in a planar view,
the case outer peripheral portion is placed on an upper end of the first fixing portion,
the housing is provided with a second fixing portion within a range surrounded by the first fixing portion, and
the case is fastened to the first fixing portion by a fastening member, fitted to the second fixing portion, and thereby fixed to the housing.

2. The work machine according to claim 1, wherein the case is provided with a cover covering the battery in an openable and closable manner.

3. The work machine according to claim 1, wherein the battery is provided in front of the motor.

4. The work machine according to claim 1, wherein the working unit is a blade that mows lawn grass below the housing.

5. The work machine according to claim 2, wherein the battery is provided in front of the motor.

* * * * *